US012717878B2

(12) United States Patent
Zhang et al.

(10) Patent No.: US 12,717,878 B2
(45) Date of Patent: Aug. 25, 2026

(54) IMPUTING MACHINE LEARNING TRAINING DATA

(71) Applicant: INTERNATIONAL BUSINESS MACHINES CORPORATION, Armonk, NY (US)

(72) Inventors: A Peng Zhang, Xian (CN); Xiao Ming Ma, Xi'an (CN); Lei Gao, Xian (CN); Jin Wang, Xi'an (CN); Kai Li, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 17/457,665

(22) Filed: Dec. 5, 2021

(65) Prior Publication Data

US 2023/0177119 A1 Jun. 8, 2023

(51) Int. Cl.
*G06F 18/23* (2023.01)
*G06N 7/01* (2023.01)

(52) U.S. Cl.
CPC ............... *G06F 18/23* (2023.01); *G06N 7/01* (2023.01)

(58) Field of Classification Search
CPC ........... G06F 18/23; G06F 18/27; G06N 7/01; G06N 20/00
See application file for complete search history.

(56) References Cited

U.S. PATENT DOCUMENTS 9,443,194 B2 9/2016 Chu et al.
10,592,368 B2 3/2020 Guo et al.
11,676,719 B2 * 6/2023 Feczko .................. G16H 20/70 706/12
2007/0099239 A1 * 5/2007 Tabibiazar ............. G16B 40/20 435/7.1
2013/0226842 A1 8/2013 Chu
2015/0322514 A1 * 11/2015 Ginsburg ............... A61K 31/60 435/6.12
2016/0223554 A1 * 8/2016 Cesano ............ G01N 33/57505
2018/0068033 A1 3/2018 Bandyopadhyay et al.
2019/0303471 A1 * 10/2019 Lee ..................... G06F 16/2365
2019/0378022 A1 12/2019 Wang et al.
2020/0333170 A1 10/2020 Uwano
2021/0049428 A1 2/2021 Huang et al.
2021/0182602 A1 6/2021 V
2021/0342490 A1 * 11/2021 Briancon ............. G06N 3/0475
2023/0153582 A1 * 5/2023 Sahraeian ........... G03F 7/70633 706/15

OTHER PUBLICATIONS

Samih M. Mostafa, Imputing missing values using cumulative linear regression, CAAI, Section 3 (Year: 2019).*

(Continued)

*Primary Examiner* — Usmaan Saeed
(74) *Attorney, Agent, or Firm* — Harrity & Harrity, LLP

(57) ABSTRACT

Embodiments are disclosed for a method. The method includes determining a correlation list of missing value predictors. The method also includes generating a cluster model having multiple clusters. The cluster model is based on a target value and predictor values. The method further includes determining an imputed value for a missing value of a row of original training data based on a linear regression model for multiple non-missing value predictor values for the clusters.

20 Claims, 12 Drawing Sheets

(56) References Cited

OTHER PUBLICATIONS

Brownlee, “Iterative Imputation for Missing Values in Machine Learning”, Navigation-Machine Learning Mastery, 26 pgs, Last updated on Aug. 18, 2020, <https://machinelearningmastery.com/iterative-imputation-for-missing-val . . . >.

Honghai, et al., “A Smv Regression Based Approach to Filing in Missing Values”, International Conference on Knowledge-Based and Intelligent Information and Engineering Systems, R. Khosla et al. (Eds.): KES 2005, LNAI vol. 3683, 7 Pgs, © Springer-Verlag Berlin Heidelberg 2005.

Li et al.; “Towards Missing Data Imputation: A Study of Fuzzy K-means Clustering Method”, S. Tsumoto et al. (Eds.): RSCTC 2004, LNAI vol. 3066, Springer-Verlag Berlin Heidelberg 2004, 7 Pgs.

Mell et al., “The NIST Definition of Cloud Computing”, National Institute of Standards and Technology, Special Publication 800-145, Sep. 2011, 7 pages.

* cited by examiner

200

| ROW # | x1 | x2 | x3 | x4 | x5 | x6 | m1 | m2 | m3 | m4 | x7 | x8 | y |
|---|---|---|---|---|---|---|---|---|---|---|---|---|---|
| 1 | 99.5 | 178.2 | 67.9 | 52 | 3053 | 131 | 3.13 | 3.4 | 7 | 160 | 16 | 22 | 15250 |
| 2 | 101.2 | 176.8 | 64.8 | 54.3 | 2395 | 108 | 3.5 | 2.8 | 8.8 | 101 | 23 | 29 | 16430 |
| 3 | 101.2 | 176.8 | 64.8 | 54.3 | 2395 | 108 | * | * | * | * | 23 | 29 | 16925 |
| 4 | 101.2 | 176.8 | 64.8 | 54.3 | 2710 | 164 | * | * | * | * | 21 | 28 | 20970 |
| 5 | 101.2 | 176.8 | 64.8 | 54.3 | 2765 | 164 | * | * | * | * | 21 | 28 | 21105 |
| 6 | 103.5 | 189 | 66.9 | 55.7 | 3055 | 164 | * | * | * | * | 20 | 25 | 24565 |
| 7 | 103.5 | 189 | 66.9 | 55.7 | 3230 | 209 | * | * | * | * | 16 | 22 | 30760 |
| 8 | 103.5 | 193.8 | 67.9 | 53.7 | 3380 | 209 | * | * | * | * | 16 | 22 | 41315 |
| 9 | 110 | 197 | 70.9 | 56.3 | 3505 | 209 | 3.62 | 3.39 | 8 | 182 | 15 | 20 | 36880 |
| 10 | 88.4 | 141.1 | 60.3 | 53.2 | 1488 | 61 | 2.91 | 3.03 | 9.5 | 48 | 47 | 53 | 5151 |
| 11 | 94.5 | 155.9 | 63.6 | 52 | 1874 | 90 | 3.03 | 3.11 | 9.6 | 70 | 38 | 43 | 6295 |
| 12 | 94.5 | 158.8 | 63.6 | 52 | 1909 | 90 | 3.03 | 3.11 | 9.6 | 70 | 38 | 43 | 6575 |
| 13 | 93.7 | 157.3 | 63.8 | 50.8 | 1876 | 90 | 2.97 | 3.23 | 9.41 | 68 | 37 | 41 | 5572 |

FIG. 2

| ROW # | y | CA |
|---|---|---|
| 1 | 15250 | CA2 |
| 2 | 16430 | CA2 |
| 3 | 16925 | CA2 |
| 4 | 20970 | CA3 |
| 5 | 21105 | CA3 |
| 6 | 24565 | CA3 |
| 7 | 30760 | CA4 |
| 8 | 41315 | CA4 |
| 9 | 36880 | CA4 |
| 10 | 5151 | CA1 |
| 11 | 6295 | CA1 |
| 12 | 6575 | CA1 |

| ROW # | x1 | x2 | x3 | x4 | x5 | x6 | x7 | x8 | y | CA |
|---|---|---|---|---|---|---|---|---|---|---|
| 1 | 99.5 | 178.2 | 67.9 | 52 | 3053 | 131 | 16 | 22 | 15250 | CA2 |
| 2 | 101.2 | 176.8 | 64.8 | 54.3 | 2395 | 108 | 23 | 29 | 16430 | CA2 |
| 3 | 101.2 | 176.8 | 64.8 | 54.3 | 2395 | 108 | 23 | 29 | 16925 | CA2 |
| 4 | 101.2 | 176.8 | 64.8 | 54.3 | 2710 | 164 | 21 | 28 | 20970 | CA3 |
| 5 | 101.2 | 176.8 | 64.8 | 54.3 | 2765 | 164 | 21 | 28 | 21105 | CA3 |
| 6 | 103.5 | 189 | 66.9 | 55.7 | 3055 | 164 | 20 | 25 | 24565 | CA3 |
| 7 | 103.5 | 189 | 66.9 | 55.7 | 3230 | 209 | 16 | 22 | 30760 | CA4 |
| 8 | 103.5 | 193.8 | 67.9 | 53.7 | 3380 | 209 | 16 | 22 | 41315 | CA4 |
| 9 | 110 | 197 | 70.9 | 56.3 | 3505 | 209 | 15 | 20 | 36880 | CA4 |
| 10 | 88.4 | 141.1 | 60.3 | 53.2 | 1488 | 61 | 47 | 53 | 5151 | CA1 |
| 11 | 94.5 | 155.9 | 63.6 | 52 | 1874 | 90 | 38 | 43 | 6295 | CA1 |
| 12 | 94.5 | 158.8 | 63.6 | 52 | 1909 | 90 | 38 | 43 | 6575 | CA1 |

400C

| ROW # | x1 | x2 | x3 | x4 | x5 | x6 | x7 | x8 | y | CA | CB |
|---|---|---|---|---|---|---|---|---|---|---|---|
| 1 | 99.5 | 178.2 | 67.9 | 52 | 3053 | 131 | 16 | 22 | 15250 | CA2 | CBA21 |
| 2 | 101.2 | 176.8 | 64.8 | 54.3 | 2395 | 108 | 23 | 29 | 16430 | CA2 | CBA25 |
| 3 | 101.2 | 176.8 | 64.8 | 54.3 | 2395 | 108 | 23 | 29 | 16925 | CA2 | CBA21 |
| 4 | 101.2 | 176.8 | 64.8 | 54.3 | 2710 | 164 | 21 | 28 | 20970 | CA3 | CBA31 |
| 5 | 101.2 | 176.8 | 64.8 | 54.3 | 2765 | 164 | 21 | 28 | 21105 | CA3 | CBA31 |
| 6 | 103.5 | 189 | 66.9 | 55.7 | 3055 | 164 | 20 | 25 | 24565 | CA3 | CBA36 |
| 7 | 103.5 | 189 | 66.9 | 55.7 | 3230 | 209 | 16 | 22 | 30760 | CA4 | CBA42 |
| 8 | 103.5 | 193.8 | 67.9 | 53.7 | 3380 | 209 | 16 | 22 | 41315 | CA4 | CBA42 |
| 9 | 110 | 197 | 70.9 | 56.3 | 3505 | 209 | 15 | 20 | 36880 | CA4 | CBA42 |
| 10 | 88.4 | 141.1 | 60.3 | 53.2 | 1488 | 61 | 47 | 53 | 5151 | CA1 | CBA13 |
| 11 | 94.5 | 155.9 | 63.6 | 52 | 1874 | 90 | 38 | 43 | 6295 | CA1 | CBA13 |
| 12 | 94.5 | 158.8 | 63.6 | 52 | 1909 | 90 | 38 | 43 | 6575 | CA1 | CBA13 |

FIG. 4C

| ROW # | x1 | x2 | x3 | x4 | x5 | x6 | m3 | x7 | x8 | y | CA | CB |
|---|---|---|---|---|---|---|---|---|---|---|---|---|
| 3 | 101.2 | 176.8 | 64.8 | 54.3 | 2395 | 108 | * | 23 | 29 | 16925 | CA2 | CBA21 |

400E-1

| ROW # | x1 | x2 | x3 | x4 | x5 | x6 | m3 | x7 | x8 | y |
|---|---|---|---|---|---|---|---|---|---|---|
| 1 | 99.5 | 178.2 | 67.9 | 52 | 3053 | 131 | 7 | 16 | 22 | 15250 |
| 2 | 101.2 | 176.8 | 64.8 | 54.3 | 2395 | 108 | 8.8 | 23 | 29 | 16430 |
| 3 | 101.2 | 176.8 | 64.8 | 54.3 | 2395 | 108 | * | 29 | 29 | 16925 |
| 4 | 101.2 | 176.8 | 64.8 | 54.3 | 2710 | 164 | * | 21 | 28 | 20970 |
| 5 | 101.2 | 176.8 | 64.8 | 54.3 | 2765 | 164 | * | 21 | 28 | 21105 |
| 6 | 103.5 | 189 | 66.9 | 55.7 | 3055 | 164 | * | 20 | 25 | 24565 |

400E-2

| ROW # | x1 | x2 | x3 | x4 | x5 | x6 | m3 | x7 | x8 | y |
|---|---|---|---|---|---|---|---|---|---|---|
| 1 | 99.5 | 178.2 | 67.9 | 52 | 3053 | 131 | 7 | 16 | 22 | 15250 |
| 2 | 101.2 | 176.8 | 64.8 | 54.3 | 2395 | 108 | 8.8 | 23 | 29 | 16430 |
| 3 | 101.2 | 176.8 | 64.8 | 54.3 | 2395 | 108 | 9.4 | 23 | 29 | 16925 |
| 4 | 101.2 | 176.8 | 64.8 | 54.3 | 2710 | 164 | * | 21 | 28 | 20970 |
| 5 | 101.2 | 176.8 | 64.8 | 54.3 | 2765 | 164 | * | 21 | 28 | 21105 |
| 6 | 103.5 | 189 | 66.9 | 55.7 | 3055 | 164 | * | 20 | 25 | 24565 |

FIG. 4E

| ROW # | x1 | x2 | x3 | x4 | x5 | x6 | m1 | m2 | m3 | m4 | x7 | x8 | y |
|---|---|---|---|---|---|---|---|---|---|---|---|---|---|
| 1 | 99.5 | 178.2 | 67.9 | 52 | 3053 | 131 | 3.13 | 3.4 | 7 | 160 | 16 | 22 | 15250 |
| 2 | 101.2 | 176.8 | 64.8 | 54.3 | 2395 | 108 | 3.5 | 2.8 | **8.8** | 101 | 23 | 29 | 16430 |
| 3 | 101.2 | 176.8 | 64.8 | 54.3 | 2395 | 108 | * | * | **9.4** | * | 23 | 29 | 16925 |
| 4 | 101.2 | 176.8 | 64.8 | 54.3 | 2710 | 164 | * | * | **7.6** | * | 21 | 28 | 20970 |
| 5 | 101.2 | 176.8 | 64.8 | 54.3 | 2765 | 164 | * | * | **9.2** | * | 21 | 28 | 21105 |
| 6 | 103.5 | 189 | 66.9 | 55.7 | 3055 | 164 | * | * | **9.1** | * | 20 | 25 | 24565 |
| 7 | 103.5 | 189 | 66.9 | 55.7 | 3230 | 209 | * | * | **7.6** | * | 16 | 22 | 30760 |
| 8 | 103.5 | 193.8 | 67.9 | 53.7 | 3380 | 209 | * | * | **8.5** | * | 16 | 22 | 41315 |
| 9 | 110 | 197 | 70.9 | 56.3 | 3505 | 209 | 3.62 | 3.39 | **8** | 182 | 15 | 20 | 36880 |
| 10 | 88.4 | 141.1 | 60.3 | 53.2 | 1488 | 61 | 2.91 | 3.03 | **9.5** | 48 | 47 | 53 | 5151 |

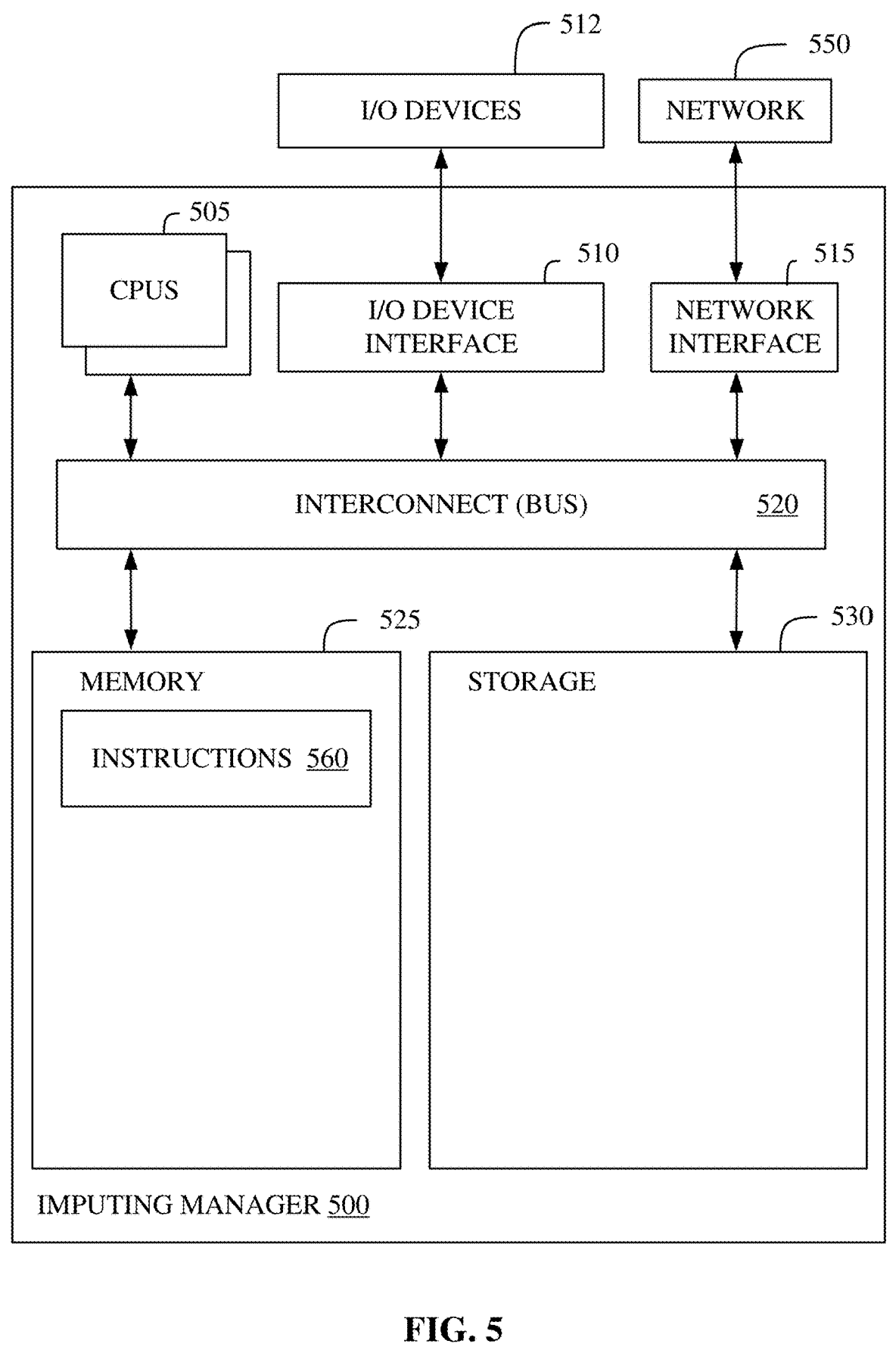

I/O DEVICES 512
NETWORK 550
CPUS 505
I/O DEVICE INTERFACE 510
NETWORK INTERFACE 515
INTERCONNECT (BUS) 520
MEMORY 525
INSTRUCTIONS 560
STORAGE 530
IMPUTING MANAGER 500

FIG. 5

IMPUTING MACHINE LEARNING TRAINING DATA

BACKGROUND

The present disclosure relates to machine learning training data and more specifically, to imputing machine learning training data.

Machine learning is a branch of artificial intelligence (AI) and computer science that uses data and algorithms to learn how to make specific types of predictions (i.e., classifications). Through the use of statistical methods, machine learning techniques train algorithms to make these predictions, which can be useful for developing insights about data.

SUMMARY

Embodiments are disclosed for a method. The method includes determining a correlation list of missing value predictors. The method also includes generating a cluster model having multiple clusters. The cluster model is based on a target value and predictor values. The method further includes determining an imputed value for a missing value of a row of original training data based on a linear regression model for multiple non-missing value predictor values for the clusters.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2 is a block diagram of example training data with missing data values, in accordance with some embodiments of the present disclosure.

FIG. 4C is a block diagram of example training data with missing data values, in accordance with some embodiments of the present disclosure.

FIG. 4E is a block diagram of example training data with imputed and missing data values, in accordance with some embodiments of the present disclosure.

FIG. 5 is a block diagram of an example imputing manager, in accordance with some embodiments of the present disclosure.

Figure 1:
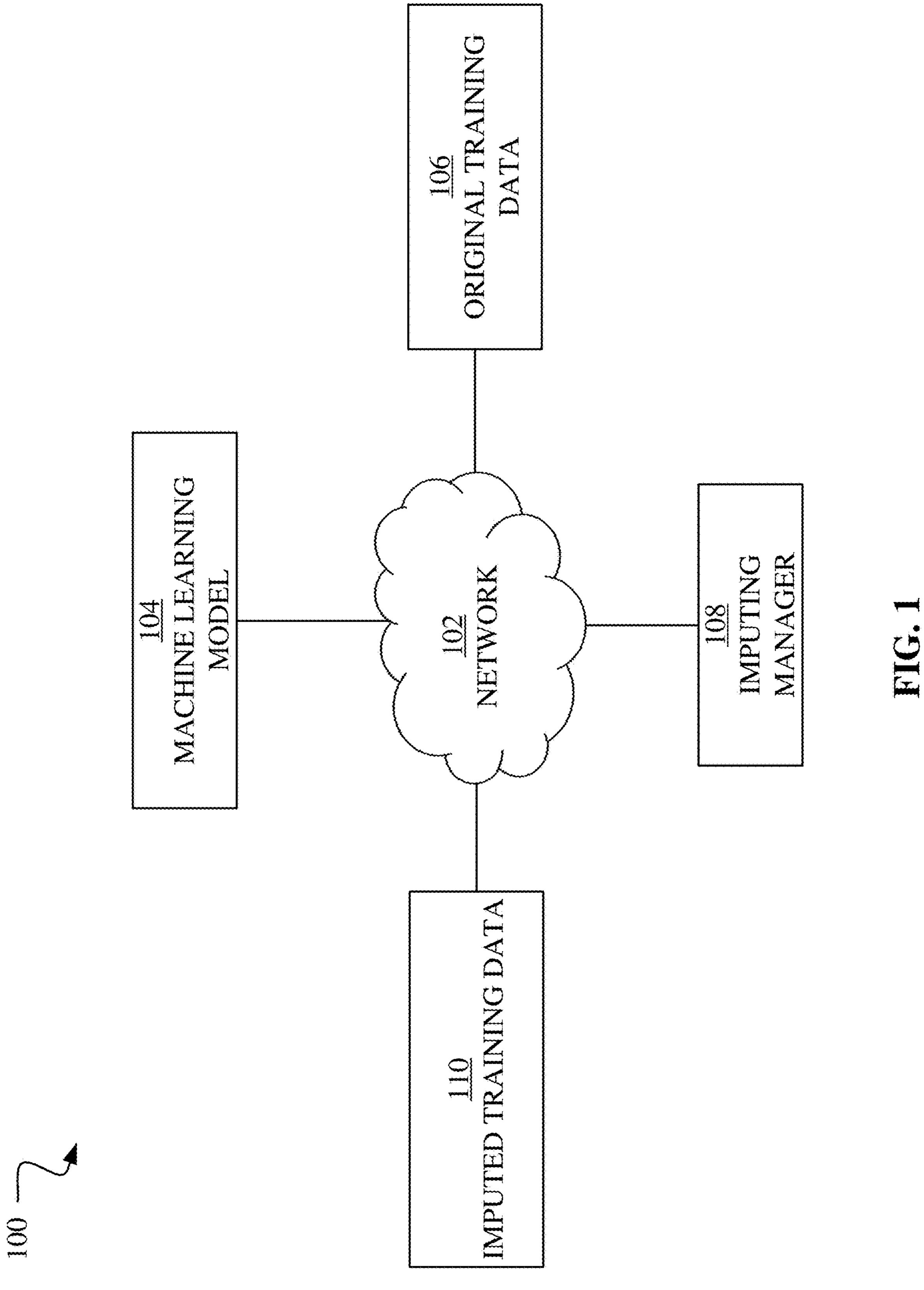
FIG. 1 is a block diagram of an example system for imputing machine learning training data, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, machine learning can involve training algorithms to make predictions (i.e., classifications) about data, which can be useful for developing relevant insights. Training these algorithms involves the use of training data. Training data can contain volumes of information relevant to a classification. For example, online retailers may collect thousands of records about each of millions of customers. These records may be converted to training data that machine learning algorithms can train on to learn how to sell more products to their customers. Information, such as, purchase histories, can include data about the transaction, the purchaser, the seller, and the like. However, in some scenarios, the training data can be incomplete. For example, individual purchase histories may not include as much information about a seller, for example. Having incomplete training data (e.g., missing data) may mean that training data having hundreds, thousands, or millions of rows (or more) may include numerous rows with no data values in various columns. These columns of missing data may be blank, have null values, zero values, and the like.

To mitigate the potential impact of missing data on a machine learning algorithm, one approach involves removing the missing data from the training data. Removing missing data may thus mean removing entire rows of data with one or more missing data values. However, this approach may mean removing useful data points for training the machine learning model.

Other approaches may involve imputing missing data. Imputing missing data may mean generating replacement values for the missing data values. Some examples of replacement values may include predetermined values, a mean of the training data (or, a mode), and the like. However, using predetermined values, mean, mode, and the like may not be useful for training because these values may not be relevant to the specific rows of training data. In another approach, imputing can involve using an additional machine learning method to generate the replacement values. However, machine learning may not be able to efficiently use relevant data in the training data that may be useful (or, timely) for generating relevant replacement values.

Accordingly, some embodiments of the present disclosure can impute missing data incrementally, and iteratively, using the available training data to replace one missing value per row at a time, and iteratively incorporating the imputed data into a corpus of training data determined relevant to the generation of subsequently imputed data, until all missing values are imputed and replaced. In this way, some embodiments of the present disclosure can improve the effectiveness of machine learning by using the relevant rows and columns of the training data to impute data values that are relevant to the rows having missing data imputed.

FIG. 1 is a block diagram of an example system 100 for security as a service for deep learning, in accordance with some embodiments of the present disclosure. The system 100 includes a network 102, machine learning model 104, training data with missing values (e.g., original training data) 106, imputing manager 108, and imputed training data 110. The network 102 may be a local area network, wide area network, or collection of computer communication networks that facilitates communication between components of the system 100, specifically, between the machine learning model 104, original training data 106, imputing manager 108, and imputed training data 110. In some embodiments, the network 102 can be the Internet.

Machine learning is a form of artificial intelligence that enables a system to learn from data rather than through explicit programming. Accordingly, the machine learning model 104 can be an algorithm trained to make a particular classification, or prediction. The machine learning model 104 may train on a training set. In some cases, the training set may be the original training data 106. The training data 106 can include the classifications for each row of the training data. In this way, the machine learning model 104 can learn how to distinguish between different classification choices. However, the original training data 106 can have missing data values (e.g., blanks, zeroes, null values). As stated previously, training machine learning models with training data having missing values can decrease the effectiveness of the training. Accordingly, in some embodiments of the present disclosure, the imputing manager 108 can generate imputed training data 110 from the original training data 106. The imputing manager 108 can impute, (i.e., replace) the "missing" values with more relevant data values than used in current approaches. Hence, the machine learning model 104 may train on the imputed training data 110. In this way, the machine learning model 104 may more efficiently train to learn a classification algorithm than possible with the original training data 106 having missing data.

Some embodiments of the present disclosure can use a cluster model to split the original training data 106 into clusters based on target values and optional predictors. Predictors can refer to columns of the original training data 106. Additionally, such embodiments can split the clusters into smaller clusters using non-missing value predictors (e.g., predictors not having missing values). Further, such embodiments may impute missing data values based on clusters using a linear regression model.

FIG. 2 is a table of example training data with missing data values (e.g., original training data) 200, in accordance with some embodiments of the present disclosure. The original training data 200 may be similar to the original training data 106 described with respect to FIG. 1.

More specifically, the original training data 200 is represented in numbered rows and columns. Each row may denote a single training data record. Thus, a machine learning model (e.g., machine learning model 104), may attempt to classify the row based on the values in each of the columns of a single row. As shown, the columns are labeled, x1 through x6, m1 through m4, x7, x8, and y. The column names are generic and not necessarily representative of actual column names in embodiments of the present disclosure. As shown, for all rows 1 through 13, the original training data 200 includes data values for columns x1 through x8 and y. However, for rows 3 through 8, columns m1 through m4 have missing data. The missing data is indicated by the asterisks in the corresponding cells. Herein, columns with missing data (e.g., m1 through m4) are also referred to as missing value predictors and missing value predictors.

Figure 3:
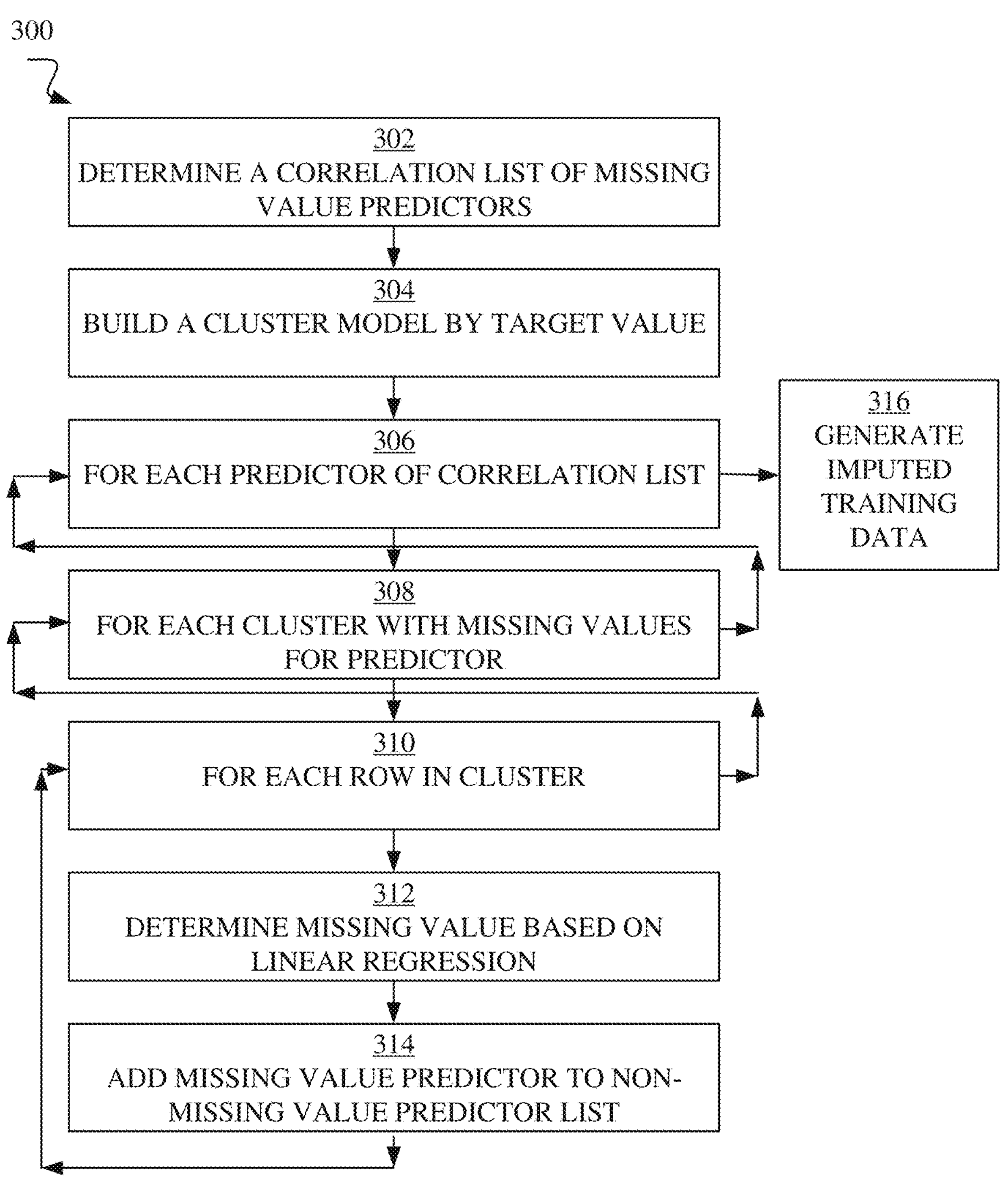
FIG. 3 is a process flow diagram of an example method for imputing machine learning training data, in accordance with some embodiments of the present disclosure.

FIG. 3 is a process flow diagram of an example method for imputing machine learning training data, in accordance with some embodiments of the present disclosure. The imputing manager 108, described with respect to FIG. 1, can perform the example method 300.

At operation 302, the imputing manager 108 can determine a correlation list of missing value predictors. More specifically, the imputing manager 108 can generate two lists: a list of missing value predictors; and, a list of missing value predictor pairs. Using the original training data 200 described with respect to FIG. 2 as an example, the list of missing value predictors may include the column names of each missing value predictor (e.g., list0=[m1, m2, m3, m4]). Additionally, the list of missing value predictor pairs may include each possible pairing of different missing value predictors. Thus, the list of missing value predictor pairs, list1, may be represented as list1=[(m1, m2), (m1, m3), (m1, m4), (m2, m3), (m2, m4), (m3, m4)].

Further, the imputing manager 108 can determine a correlation between each of the missing value predictor pairs. This correlation can represent a relationship between the missing value predictors in the missing value predictor pairs (e.g., the relationship between columns m1 and m2). Thus, the imputing manager 108 may analyze the rows in the training data where the missing value predictors have values. Based on this data, the imputing manager 108 may determine the correlation. The imputing manager 108 can use any known methods for determining correlation, such as Pearson, Spearman, Chi-square, and the like. An example of determined correlations is represented in EXAMPLE TABLE 1:

EXAMPLE TABLE 1

| | MISSING VALUE PREDICTOR PAIR | | | | | |
|---|---|---|---|---|---|---|
| | (m1, m2) | (m1, m3) | (m1, m4) | (m2, m3) | (m2, m4) | (m3, m4) |
| CORRELATION | 0.14 | 0.16 | 0.31 | 0.05 | 0.46 | 0.10 |

Thus, for missing value predictor pair, (m1, m2), the correlation may be 0.14, meaning there is a 14 percent similarity between columns m1 and m2 in the original training data 106. Similarly, there is a 16 percent similarity between columns m1 and m3. Further, there is a 31 percent similarity between columns m1 and m4. Additionally, there is a 5 percent similarity between columns m2 and m3. There is a 46 percent similarity between columns m2 and m4, and a 10 percent similarity between columns m3 and m4.

Additionally, the imputing manager 108 can determine a correlation of each missing value predictor in the list of missing value predictors. The correlation may be equal to a sum of the correlations for each missing value predictor pair with which the missing value predictor is associated. Thus, the correlations for each of missing value predictors, m1 through m4, is represented in EXAMPLE TABLE 2:

EXAMPLE TABLE 2

| | MISSING VALUE PREDICTOR | | | |
|---|---|---|---|---|
| | m1 | m2 | m3 | m4 |
| CORRELATION | 0.61 | 0.65 | 0.31 | 0.87 |

In EXAMPLE TABLE 2, because missing value predictor, m1, is associated with missing value predictor pairs having correlations of 0.14, 0.16, and 0.31, the correlation of m1 is 0.61. The missing value predictor, m2 is associated with missing value predictor pairs having correlations of 0.14, 0.05, and 0.46. Thus, the correlation for m2 is 0.65. The missing value predictor, m3 is associated with missing value predictor pairs having correlations of 0.16, 0.05, and 0.10. Thus, the correlation for m3 is 0.31. The missing value predictor, m4 is associated with missing value predictor pairs having correlations of 0.31, 0.46, and 0.10. Thus, the correlation for m2 is 0.87.

Further, the imputing manager 108 can sort the missing value predictors by increasing value of their associated correlations, as shown in in EXAMPLE TABLE 3:

EXAMPLE TABLE 3

| | MISSING VALUE PREDICTOR | | | |
|---|---|---|---|---|
| | m3 | m1 | m2 | m4 |
| CORRELATION | 0.31 | 0.61 | 0.65 | 0.87 |

Hence, the imputing manager 108 may determine a correlation list of missing value predictors (correlation list), such as the EXAMPLE CORRELATION LIST by generating a sorted list:

| MISSING VALUE PREDICTOR |
|---|
| m3 |
| m1 |
| m2 |
| m4 |

Example Correlation List

As shown, the EXAMPLE CORRELATION LIST is sorted by ascending correlation. In this example, the sort order accords with the correlations in EXAMPLE TABLE 3. The correlation list is useful with respect to determining replacement values for each missing value predictor in the sorted order, as described in greater detail with respect to operation 308.

At operation 304, the imputing manager 108 can build a cluster model by target value. Building a cluster model can involve splitting the rows of original training data 200 into different clusters (e.g., subsets of rows) based on the target value for the row. The target value can be the classification (e.g., the prediction) for the row of training data. Accordingly, building the cluster model can mean splitting subsets of rows of the original training data 200 into clusters based on their target values.

Figure 4A:
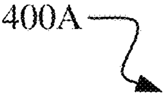
FIG. 4A is a block diagram of example training data with missing data values, in accordance with some embodiments of the present disclosure.

Operation 304 is described in greater detail with respect to FIG. 4A, which is a table 400A of clustered target values of original training data 200, in accordance with some embodiments of the present disclosure. The table 400A includes rows 1 through 12 of the original training data 200, appended with a cluster label. More specifically, the table 400A includes, the target value, column y, and a cluster A label (CA), indicating the cluster to which each row belongs. In this example, rows with: target values less than 10,000 belong to CA1; target values between 10,000 and 20,000 belong to CA2; target values between 20,000 and 30,000 belong to CA3; and, target values above 30,000 belong to CA4. Accordingly, cluster A includes four clusters: CA1, CA2, CA3, and CA4.

In some embodiments of the present disclosure, the imputing manager 108 may partition the original training data 200 into a predetermined number of clusters. Further, the imputing manager 108 may partition the original training data into a number of clusters such that each cluster may have a relatively small subset of missing value predictors.

Further, in some cases, the target value may be skewed. Being skewed may mean that there is a disproportionate number of different prediction values. For example, if the potential target values include classifications A, B, or C, and the original training data 200 includes 50% of rows with classification A, 25% of rows with classification B, and 25% of rows with classification C, the target value may be skewed because there is a relatively uneven distribution of classifications. Accordingly, in some embodiments of the present disclosure, the imputing manager 108 can add predictors to balance the skewed target. Adding predictors can mean using additional predictors for the cluster splits. The added predictors can be any predictors with a relatively large predictor importance (PI), predetermined predictors, or randomly selected predictors. Predictors having relatively large PI may have a greater influence on the target value.

Figure 4B:
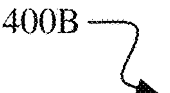
FIG. 4B is a block diagram of example training data with missing data values, in accordance with some embodiments of the present disclosure.
Figure 4D:
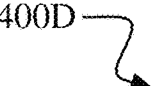
FIG. 4D is a block diagram of example training data with missing data values, in accordance with some embodiments of the present disclosure.

Operation 304 is described in greater detail with respect to FIG. 4B, which is a table 400B representing a subset of original training data 200 that is clustered by the target values, in accordance with some embodiments of the present disclosure. The table 400B includes rows 1 to 12 of the original training data 200, specifically, columns x1 through x8, y (e.g., target value), and the cluster A identifier (CA) for each row.

Additionally, the imputing manager 108 may further split each cluster into a second set of clusters, cluster B. This split may be based on the non-missing value predictors of the cluster A clusters. The non-missing value predictors may be the columns of the original training data 200 that do not have missing values (e.g., columns x1 through x8). In some embodiments of the present disclosure, the imputing manager 108 may thus split the original training data 200 by the values of the non-missing value predictors. Additionally, the imputing manager 108 may generate an n2 number of clusters. The imputing manager 108 may determine n2 based on the nature of the data and the cluster model.

Operation 304 is described in greater detail with respect to FIG. 4C, which is a table 400C representing a subset of original training data 200 that is clustered by a target value and non-missing value predictors, in accordance with some embodiments of the present disclosure. The table 400C includes rows 1 through 12 of the original training data 200, specifically, columns x1 through x8, target value y, cluster A label, and cluster B label (CB). As shown, cluster CA2 (rows 1 through 3) is further split into clusters CBA21 (rows 1 and 3) and CBA25 (row 2). Similarly, cluster CA3 (rows 4 through 6), is further split into clusters CBA31 (rows 4 and 5) and CBA36 (row 6). However, clusters CA4 (rows 7 through 9) and CA1 (rows 10 through 12), are not split, but merely copied into clusters CBA42 and CBA13. While the clusters CA1 and CA4 in this example may not show a split in these clusters, it is possible that there are other rows in the original training data 106 that include further cluster splits.

Referring back to FIG. 3, at operation 306, the imputing manager 108 can perform operation 308 for each missing value predictor of the correlation list. As stated previously, the correlation list is sorted in ascending correlation value of the missing value predictor. Further, example method 300 can iteratively determine replacement values for missing values (e.g., impute values), and thus use the imputed values as part of the basis for selecting further imputed values for other rows and missing value predictors in the original training data 106. Accordingly, imputing values on the missing value predictors with less influence (e.g., lower correlation) before missing value predictors with greater influence (e.g., higher correlation) may mitigate the potential inaccuracy that a determined (incorrect) replacement value may have on future replacement value determinations. In this way, some embodiments of the present disclosure can mitigate potential inaccuracies of the imputed values in the imputed training data 110.

At operation 308, the imputing manager 108 can perform operation 310 for each cluster with missing values for the current missing value predictor of the correlation list. The clusters for which operation 308 may be performed may be the smaller clusters of the cluster model (e.g., the cluster B clusters).

At operation 310, the imputing manager 108 can perform operations 312 through 316. More specifically, the imputing manager 108 can perform these operations for each row in the cluster having a missing value for the current missing value predictor of the correlation list.

At operation 312, the imputing manager 108 can determine a missing value for the row based on cluster rows in a non-missing value list. In some embodiments of the present disclosure, the imputing manager 108 can build a linear regression model on non-missing data in the clusters to impute a value for the current row and missing value predictor. In such embodiments, the imputed value can be determined as represented in EXAMPLE EQUATION 1:

$$MX=\beta''x''+\beta\#x\#+\beta\$x\$+\beta\%\ x\%+\ldots+\beta 0xi+\varepsilon$$

EXAMPLE EQUATION 1

In EXAMPLE EQUATION 1, MX may represent the imputed value of the missing value predictor (e.g., m1, m2, m3, or m4) for the row, and calculated based on the values of the non-missing value predictors (e.g., x1, x2, x3) and the linear regression model. In EXAMPLE EQUATION 1, the may represent a weight determined through use of the linear regression model for the relevant clusters; xi may represent further potential non-missing values. In other words, the imputing manager 108 may use the linear regression model, and the non-missing value predictors, to impute a value (e.g., MX) that replaces the missing value. Further, in some embodiments of the present disclosure, the imputing manager 108 may build a linear regression model for each imputed value. Alternatively, the imputing manager 108 may merely build a linear regression model for each cluster, or each missing value predictor.

Operation 312 is described in greater detail with respect to subset 400D of the original training data 200, in accordance with some embodiments of the present disclosure. The subset 400D includes row 3 of the original training data 200, with columns (e.g., non-missing value predictors) x1 through x8, missing value, m3, target value y, and cluster A and B designations.

Thus, in this example, the imputing manager 108 may generate a linear regression model for the cluster CBA21 using non-missing value predictors from the cluster. Further, when imputing a value for the missing value m3 of row 3, the imputing manager 108 may impute the value as shown in EXAMPLE EQUATION 2:

$$m3=\beta 101.2+\beta 176.8+\beta 64.8+\beta 54.3+\beta 2395+\beta 108+\beta 23+\beta 29+\ldots+\beta 0xi+\varepsilon$$

EXAMPLE EQUATION 2

Thus, using EXAMPLE EQUATION 2, the imputing manager 108 may impute a new value that replaces the missing value m3 for row 3 of the subset 400D. Similar to EXAMPLE EQUATION 1, the may represent a weight determined through use of the linear regression model for cluster CBA21, and xi may represent further potential non-missing value predictors. In this way, the imputing manager 108 may use the imputed value in subsequent iterations of the method 300.

At operation 314, the imputing manager 108 can add the current missing value predictor (e.g., m3) to a non-missing value predictor list. In some embodiments of the present disclosure, the imputing manager 108 may remove the current missing value predictor (e.g., mx) from the correlation list. In this way, the imputing manager 108 may subsequently use imputed values in later iterations of the method 300 that impute additional replacement values for other missing values. For example, when the imputing manager 108 determines the imputed value for m3 in row 3, the imputing manager 108 can use this imputed missing value to impute missing value for other rows having missing values for m3 in the same cluster.

When all missing value of m3 are imputed, then m3 becomes a non-missing value predictor, and m3 can then be used for imputing other missing value predictors in other clusters.

Operation 314 is described in greater detail with respect to FIG. 4E, which are tables 400E-1, 400E-2, in accordance with some embodiments of the present disclosure. The table 400E-1 can be a subset of the original training data 200. The arrow from table 400E-1 to table 400E-2 can indicate that the table 400E-2 represents a subsequent state of the table 400E-1, wherein row 3 of table 400E-2 includes an imputed value (e.g., 9.4) for missing value predictor m3. As stated previously, the imputing manager 108 may perform operations 306 through 314 for each missing value predictor of the correlation list, each cluster of the original training data 200, and each row of each cluster having missing values for the missing value predictor. Accordingly, when the imputing manager 108 performs operation 314 for the last iteration, the method 300 may flow to operation 316.

Figure 4F:
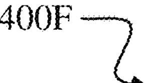
FIG. 4F is a block diagram of example training data with imputed data values, in accordance with some embodiments of the present disclosure.

At operation 316, the imputing manager 108 may generate imputed training data, such as the imputed training data 110. Operation 316 is described in greater detail with respect to FIG. 4F, which is a table 400F of a subset of imputed training data 110, in accordance with some embodiments of the present disclosure. The table 400F includes rows 1 through 10 of the imputed training data 110, which represents the original training data 200 having imputed values generated as described herein. Additionally, the table 400F includes columns x1 through x8, missing values, m1, m2, and m4, imputed values m3, and target value y.

FIG. 5 is a block diagram of an example imputing manager 500, in accordance with some embodiments of the present disclosure. In various embodiments, the imputing manager 500 is similar to the imputing manager 108 and can perform the method described in FIG. 3 and/or the functionality discussed in FIGS. 1, 2, and 4A through 4F. In some embodiments, the imputing manager 500 provides instructions for the aforementioned methods and/or functionalities to a client machine such that the client machine executes the method, or a portion of the method, based on the instructions provided by the imputing manager 500. In some embodiments, the imputing manager 500 comprises software executing on hardware incorporated into a plurality of devices.

The imputing manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the imputing manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the method described in FIG. 3 and/or the functionality discussed in FIGS. 1, 2, and 4A through 4F.

In various embodiments, the I/O devices 512 include an interface capable of presenting information and receiving input. For example, I/O devices 512 can present information to a listener interacting with imputing manager 500 and receive input from the listener.

The imputing manager 500 is connected to the network 550 via the network interface 515. Network 550 can comprise a physical, wireless, cellular, or different network.

In some embodiments, the imputing manager 500 can be a multi-user mainframe computer system, a single-user system, or a server computer or similar device that has little or no direct user interface but receives requests from other computer systems (clients). Further, in some embodiments, the imputing manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary imputing manager 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
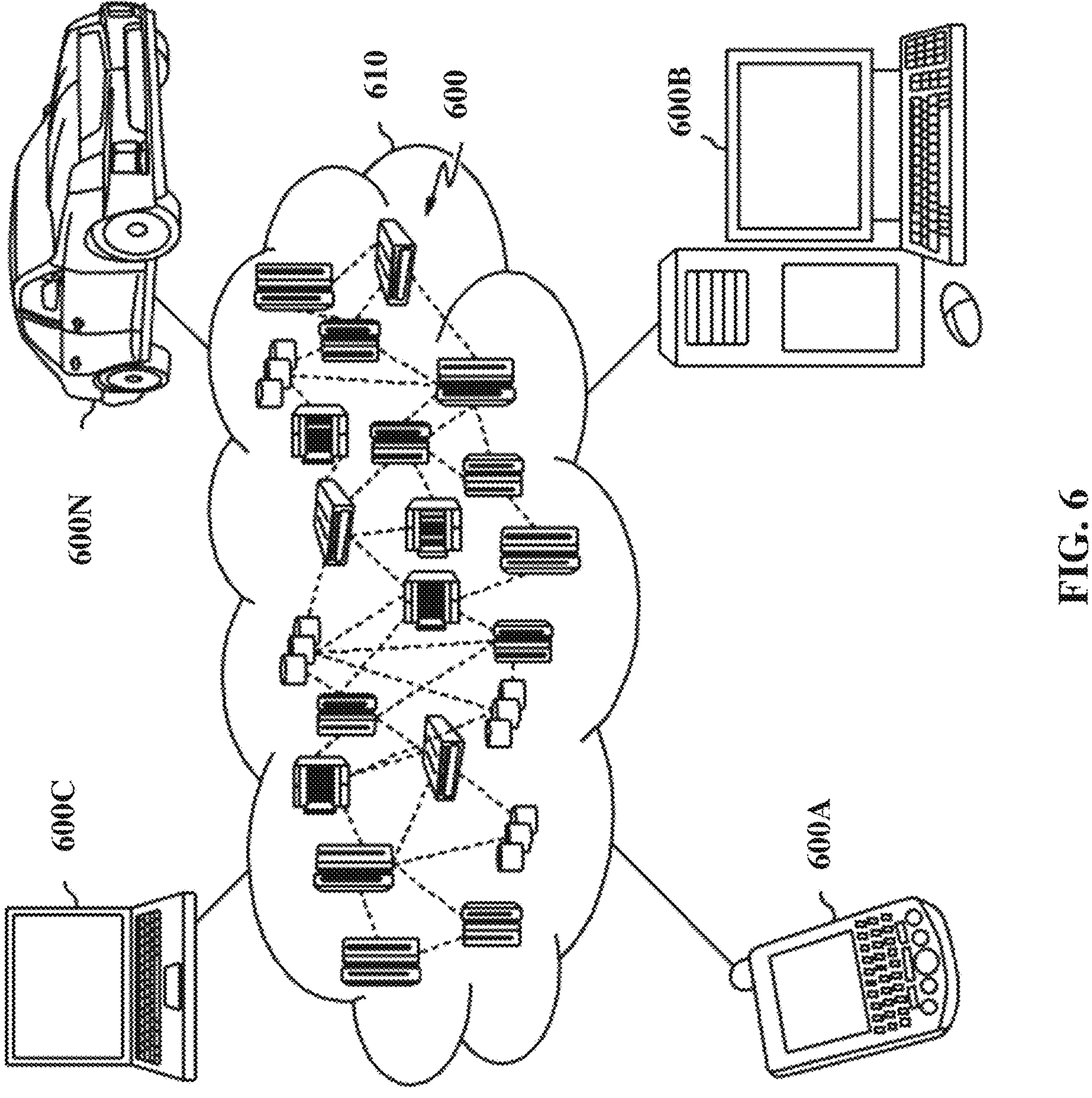
FIG. 6 is a cloud computing environment, according to some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the method described in FIG. 3 and/or the functionality discussed in FIGS. 1, 2, and 4A through 4F. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
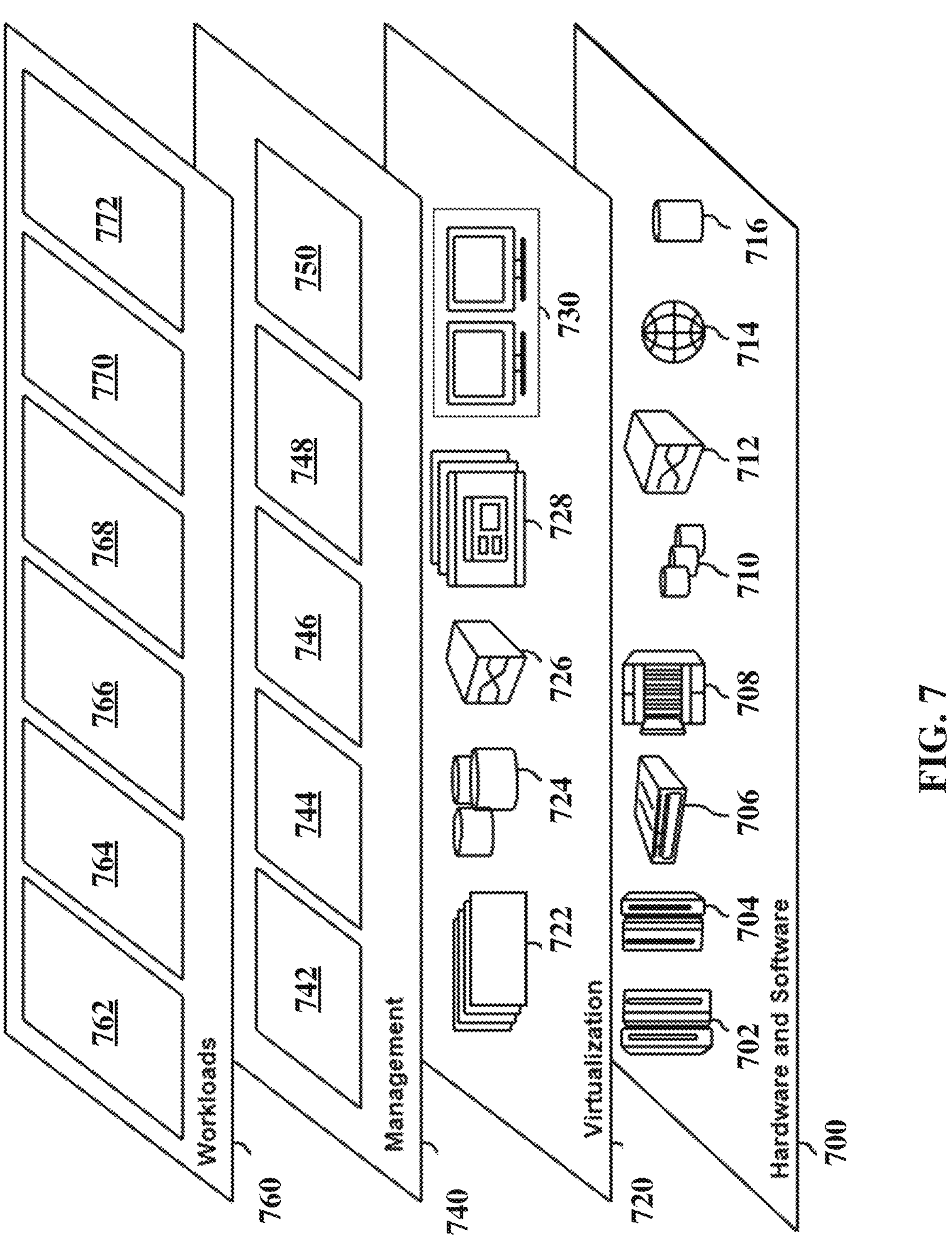
FIG. 7 is a set of functional abstraction model layers provided by cloud computing environment, according to some embodiments of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and imputing manager 772.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:

one or more computer processing circuits; and one or more computer-readable storage media storing program instructions which, when executed by the one or more computer processing circuits, are configured to cause the one or more computer processing circuits to perform actions comprising:

executing an imputing manager configured to generate imputed training data from original training data for training a machine learning model, wherein the imputing manager generates the imputed training data by:

determining a correlation list comprising a plurality of missing value predictors in the original training data, wherein one or more correlations represent a respective relationship between each of the plurality of missing value predictors in a plurality of missing value predictor pairs;

sorting the correlation list by increasing value of the one or more correlations;

generating a cluster model having a plurality of clusters, wherein the cluster model is based on a target value and a plurality of non-missing value predictor values, comprising:

splitting one or more rows of the original training data into the plurality of clusters based on the target value for the one or more rows, wherein the target value is a classification for the one or more rows;

determining an imputed value for a missing value of the one or more rows of the original training data based on a linear regression model for the plurality of clusters and the plurality of non-missing value predictor values, wherein the imputed value for a first missing value predictor of the plurality of missing value predictors with a lower value of the one or more correlations is imputed before a second missing value predictor of the plurality of missing value predictors with more correlation;

updating the cluster model based on the imputed value;

updating the linear regression model based on the plurality of non-missing value predictor values and the imputed value;

determining a plurality of imputed values for a corresponding plurality of missing values of a plurality of rows of the original training data, based on the updated linear regression model;

generating the imputed training data by incorporating the imputed value into the original training data; and training the machine learning model with the imputed training data generated by the imputing manager to classify the one or more rows according to the target value.

2. The system of claim 1, wherein generating the imputed training data further comprises incorporating the plurality of imputed values into the original training data.

3. The system of claim 1, wherein the actions further comprise removing a missing value predictor associated with the missing value from the correlation list in response to replacing all of a plurality of missing values for the missing value predictor.

4. The system of claim 3, wherein the plurality of missing value predictors comprises a plurality of column pairs of the original training data sorted in an ascending order of a correlation between each column of a respective column pair of the plurality of column pairs.

5. The system of claim 1, wherein each of the plurality of missing value predictors comprises a missing value of the original training data.

6. The system of claim 1, wherein generating the cluster model further comprises, for at least one cluster of the plurality of clusters, partitioning the at least one cluster into a second set of clusters based on values of non-missing value predictors of the at least one cluster, wherein determining the imputed value comprises generating the linear regression model using non-missing data from one of the second set of clusters that includes a row having the missing value.

7. The system of claim 1, wherein the actions further comprise:

determining that all missing values for a current missing value predictor of the plurality of missing value predictors have been imputed; and utilizing the current missing value predictor as a non-missing value predictor for imputing another missing value predictor of the plurality of missing value predictors in another of the plurality of clusters.

8. The system of claim 1, wherein the actions further comprise imputing missing data incrementally and iteratively by using available training data to replace one missing value per row at a time and iteratively incorporating imputed data into the original training data for generating subsequently imputed data until all missing values are imputed and replaced.

9. A computer-implemented method, comprising:

executing an imputing manager configured to generate imputed training data from original training data for training a machine learning model, wherein the imputing manager generates the imputed training data by:

determining a correlation list comprising a plurality of missing value predictors, wherein each of the plurality of missing value predictors comprise a missing value of the original training data, wherein one or more correlations represent a respective relationship between each of the plurality of missing value predictors in a plurality of missing value predictor pairs;

sorting the correlation list by increasing value of the one or more correlations;

generating a cluster model having a plurality of clusters, wherein the cluster model is based on a target value and a plurality of non-missing value predictor values, comprising:

splitting one or more rows of the original training data into the plurality of clusters based on the target value for the one or more rows, wherein the target value is a classification for the one or more rows;

determining an imputed value for a missing value of the one or more rows of the original training data based on a linear regression model for the plurality of clusters and the plurality of non-missing value predictor values, wherein the imputed value for a first missing value predictor of the plurality of missing value predictors with a lower value of the one or more correlations is imputed before a second missing value predictor of the plurality of missing value predictors with a higher value of the one or more correlations;

updating the cluster model based on the imputed value;

updating the linear regression model based on the plurality of non-missing value predictor values and the imputed value;

determining a plurality of imputed values for a corresponding plurality of missing values of a plurality of rows of the original training data, based on the updated linear regression model;

generating the imputed training data by incorporating the imputed value into the original training data; and training the machine learning model with the imputed training data generated by the imputing manager to classify the one or more rows according to the target value.

10. The method of claim 9, further comprising generating the imputed training data by incorporating the plurality of imputed values into the original training data.

11. The method of claim 9, further comprising removing a missing value predictor associated with the missing value from the correlation list in response to replacing all of a plurality of missing values for the missing value predictor.

12. The method of claim 11, wherein the plurality of missing value predictors comprises a plurality of column pairs of the original training data sorted in an ascending order of a correlation between each column of a respective column pair of the plurality of column pairs.

13. The method of claim 9, wherein generating the cluster model further comprises, for at least one cluster of the plurality of clusters, partitioning the at least one cluster into a second set of clusters based on values of non-missing value predictors of the at least one cluster, wherein determining the imputed value comprises generating the linear regression model using non-missing data from one of the second set of clusters that includes a row having the missing value.

14. The method of claim 9, further comprising:

determining that all missing values for a current missing value predictor of the plurality of missing value predictors have been imputed; and utilizing the current missing value predictor as a non-missing value predictor for imputing another missing value predictor of the plurality of missing value predictors in another of the plurality of clusters.

15. The method of claim 9, further comprising imputing missing data incrementally and iteratively by using available training data to replace one missing value per row at a time and iteratively incorporating imputed data into the original training data for generating subsequently imputed data until all missing values are imputed and replaced.

16. A computer program product comprising one or more computer readable storage media, and program instructions collectively stored on the one or more computer readable storage media, the program instructions comprising instructions configured to cause one or more processors to perform actions comprising:

executing an imputing manager configured to generate imputed training data from original training data for training a machine learning model, wherein the imputing manager generates the imputed training data by:

determining a correlation list comprising a plurality of missing value predictors, wherein each of the plurality of missing value predictors comprise a missing value of the original training data, wherein one or more correlations represent a respective relationship between each of the plurality of missing value predictors in a plurality of missing value predictor pairs;

sorting the correlation list by increasing value of the one or more correlations;

generating a cluster model having a plurality of clusters, wherein the cluster model is based on a target value and a plurality of non-missing value predictor values, comprising:

splitting one or more rows of the original training data into the plurality of clusters based on the target value for the one or more rows, wherein the target value is a classification for the one or more rows;

determining an imputed value for a missing value of the one or more rows of the original training data based on a linear regression model for the plurality of clusters and the plurality of non-missing value predictor values, wherein the imputed value for a first missing value predictor of the plurality of missing value predictors with a lower value of the one or more correlations is imputed before a second missing value predictor of the plurality of missing value predictors with a higher value of the one or more correlations;

updating the cluster model based on the imputed value;

updating the linear regression model based on the plurality of non-missing value predictor values and the imputed value;

determining a plurality of imputed values for a corresponding plurality of missing values of a plurality of rows of the original training data, based on the updated linear regression model;

generating the imputed training data by incorporating the imputed value into the original training data; and training the machine learning model with the imputed training data generated by the imputing manager to classify the one or more rows according to the target value.

17. The computer program product of claim 16, wherein generating the imputed training data further comprises incorporating the plurality of imputed values into the original training data.

18. The computer program product of claim 16, wherein the actions further comprise removing a missing value predictor associated with the missing value from the correlation list in response to replacing all of a plurality of missing values for the missing value predictor.

19. The computer program product of claim 18, wherein the plurality of missing value predictors comprises a plurality of column pairs of the original training data sorted in an ascending order of a correlation between each column of a respective column pair of the plurality of column pairs.

20. The computer program product of claim 16, wherein the actions further comprise:

determining that all missing values for a current missing value predictor of the plurality of missing value predictors have been imputed; and utilizing the current missing value predictor as a non-missing value predictor for imputing another missing value predictor of the plurality of missing value predictors in another of the plurality of clusters.

* * * * *